United States Patent
Colgan

(10) Patent No.: US 6,524,667 B1
(45) Date of Patent: Feb. 25, 2003

(54) WET WASTE COMPOSTABLE BAG AND METHOD AND APPARATUS FOR MANUFACTURING SAME

(75) Inventor: George P. Colgan, Kingston (CA)

(73) Assignee: Prescott Paper Products (USA), Inc., Kingston (CA)

( * ) Notice: Subject to any disclaimer, the term of this patent is extended or adjusted under 35 U.S.C. 154(b) by 0 days.

(21) Appl. No.: 09/572,130

(22) Filed: May 17, 2000

(51) Int. Cl.[7] .............................................. B29D 22/00
(52) U.S. Cl. ..................... 428/34.2; 428/35.2; 428/481; 428/532; 428/913; 383/1
(58) Field of Search ............................... 428/34.3, 35.2, 428/481, 532, 913; 383/1

(56) References Cited

U.S. PATENT DOCUMENTS

| | | | |
|---|---|---|---|
| 3,330,715 A | | 7/1967 | Terzuoli |
| 5,178,469 A | * | 1/1993 | Collinson ........................ 383/1 |
| 5,434,004 A | * | 7/1995 | Ajioka et al. ............. 428/411.1 |
| 5,679,421 A | * | 10/1997 | Brinton, Jr. ................ 428/34.3 |

FOREIGN PATENT DOCUMENTS

| | | |
|---|---|---|
| GB | 1341605 | 12/1973 |
| GB | 1509267 | 5/1978 |
| JP | 05043747 | 6/1997 |
| JP | 09142485 | 6/1997 |

* cited by examiner

Primary Examiner—Mark L. Bell
Assistant Examiner—Shalie Manlove
(74) Attorney, Agent, or Firm—Cassan Maclean

(57) ABSTRACT

A biodegradable, compostable, liquid-impermeable lined paper bag for containing wet wastes. All adhesives used in the process are cold glues applied without using heat, through an extrusion and/or metering application means. Cellulose film is used for the paper liner and dot matrix configuration of adhesive is applied between the cellulose and paper layers for lamination. The matrix-defined size of spacings between the points of application of adhesive on the cellulose film are preselected to permit passage of water vapour and oxygen through the cellulose-laminated paper and reduce stress points on the cellulose film. A second cold glue is applied to the bag bottom section by a matrix of extrusion adhesive guns via a programmable controller to predetermined areas of the bag bottom section.

12 Claims, 9 Drawing Sheets

WET WASTE COMPOSTABLE BAG AND METHOD AND APPARATUS FOR MANUFACTURING SAME

FIELD OF THE INVENTION

This invention relates to an energy efficient method and apparatus for manufacturing of a biodegradable, compostable, liquid-impermeable lined paper bag for containing wet (i.e. food) wastes by which all adhesives used in the process are cold glues applied without using heat and are applied through an extrusion and/or metering application means.

BACKGROUND OF THE INVENTION

For environmental reasons government authorities are increasingly either encouraging or requiring household occupants to recycle their waste products. In the past this was typically limited to dry waste such as leaves and lawn clippings, glass, paper and tin but, more recently, compostable wet waste materials such as food and table scraps are also being considered recyclable (through the use of cellulose-lined paper compostable bags).

According to some of the known and used manufacturing methods for wet waste bags an inner polymer layer is laminated to an outer paper layer(s) using heat to activate glues such as starches and/or to melt and seal the film coatings. However, such methods are disadvantageously expensive because they require much heat energy, involve multiple-step processing (in order to provide heating and drying periods for the glues) and require the purchase of relatively expensive hot application glues. Moreover, even if such polymer layers are comprised of biodegradable materials they typically do not degrade into compost as efficiently as does a cellulose film and, more disadvantageously, they are not permeable to allow the transfer of water vapour and oxygen there through which means that any bags lined with these materials cannot satisfactorily store wet waste such as food waste over any significant period of time because such wastes will undergo an anaerobic decomposition when the bag is sealed and exude foul odours.

Cellulose films provide substantial advantage over polymer films in that they are permeable to water vapour and oxygen yet are generally impermeable to liquid (note that although there exist cellulose films which are also permeable to liquid these types of films are not contemplated herein and all references herein to cellulose film refer to those films which are generally impermeable to liquid). However, they have associated with them two disadvantages, one being that they are relatively brittle and tend to break when stressed and the other being that they are degraded and damaged by heat. Consequently, a lamination of cellulose film to paper using the usual heat processes to heat the plasticized surfaces of the cellulose and affix it to the paper would cause damage to the cellulose and the resulting bag product would have a limited shelf life and low handling tolerance (since the cellulose layer would be prone to an early breaking and tearing away from the paper layer). Since the purpose of the bag is to effectively contain wet waste over a period of time, and the cellulose layer is used to retard the transfer of liquid (moisture) from the inside to the outside of the bag, such damage to the cellulose layer renders the product ineffective and unsuited to its purpose.

To minimize such heat exposure, reduce adhesive material usage and avoid blockage of the permeable membrane provided by the cellulose, it is known to apply glues to the cellulose in patches or strips. For example, U.S. Pat. No. 5,178,469 which issued to Woods End Research Laboratory on Jan. 12, 1993 discloses a biodegradable bag having a cellulose lining which is affixed to the paper layer using an adhesive which is applied, using drip feeders, in spaced strips between the paper and cellulose layers. However, such an uneven coverage of adhesive between the paper/cellulose layers produces relatively large spacings between the points of attachment of the cellulose and produces stress points at each new strip (patch boundary). In such products, where the cellulose joins to the paper there is an increased tendency of the cellulose to tear at these stress points. Also, such drip feeder means of applying glue is inherently inaccurate and disadvantageously wastes a significant amount of glue material.

A further disadvantage with the prior methods and means of making compostable bags is the excessive and/or ineffective usage of adhesives in the formation of the bag bottom. According to known processes the bag bottom is formed using adhesive applied by fixed roller applicators with a drip feed and this does not allow any control over the application either with respect to location or deposition volume. Since it is important that the bag bottom be fully closed off (i.e. sealed) to avoid leakage of liquid it is important that the score lines of the bag bottom and other fold areas of the bag bottom be effectively glued. Also, since biodegradable adhesives are relatively costly it is important that wastage of the glue be avoided and imprecise glue application means are inherently wasteful and non-economic.

Therefore, it is desirable to provide a cost effective means of making a wet waste compostable bag which allows for use of a cellulose layer without the application of heat thereto yet securely and fully adheres the cellulose to the paper layer without producing substantial stress points and with minimal interference of the permeability of the cellulose to water vapour and oxygen. Further, it is desirable to provide a means of more precisely and efficiently applying adhesive to those areas of the bag, particularly the bag bottom, which require placement of adhesive at specific locations for an effective formation of a wet waste bag.

SUMMARY OF THE INVENTION

In accordance with one aspect of the invention there is provided a compostable bag for containing wet waste and comprising cellulose-laminated paper, the cellulose-laminated paper comprising one or more adjacent outer paper layers and an inner cellulose film layer laminated to an innermost one of the paper layers by means of an adhesive in a dot matrix configuration. The matrix-defined size of spacings between the points of application of adhesive on the cellulose film is such that both loss of the permeability of the cellulose film to water vapour and oxygen and creation of stress points on the cellulose film are minimized. The adhesive is a cold glue and the cellulose film itself has a high water vapour transfer rate. Preferably the water vapour transfer rate through the bag is about 65% of the water vapour transfer rate of the cellulose film itself. The bottom of the bag comprises folds and layers of the cellulose-laminated paper wherein the layers are adhered together by means of a second adhesive which is preferably applied in a pre-determined, programmable pattern by a matrix of extrusion adhesive guns activated according to a program of a pre-programmed controller.

In accordance with another aspect of the invention there is provided a method of making a wet waste compostable bag. A first adhesive, being a cold glue, is applied to one of a cellulose film and paper sheet in a pre-determined dot matrix configuration. The matrix-defined size of spacings between the points of application of the first adhesive on the cellulose film is such that both loss of the permeability of the cellulose film to water vapour and oxygen and creation of stress points on the cellulose film of the resulting bag are minimized. The cellulose film and paper sheet are overlaid with the dot matrix configuration of adhesive between them and sufficient pressure is applied to the overlaid film and sheet to produce a cellulose film/paper laminate web and the laminate web is formed into a tube. The tube is cut into separate bag pieces and one end of each bag pieces is folded for configuring a bag bottom section with flaps. A second adhesive is applied to the bag bottom section and the flaps are folded together over the bag bottom section. Sufficient pressure is applied for the adhesive to affix the folded flaps and provide a closed bag bottom. The second adhesive, being a cold glue, is preferably applied to pre-determined, programmable areas of the bag bottom section by means of a matrix of extrusion adhesive guns activated according to a program of a pre-programmed controller.

In accordance with a further aspect of the invention there is provided apparatus for making a wet waste compostable bag comprising a matrix of extrusion adhesive guns and programmable controller for activating the guns whereby the guns are activated according to a program of the controller for applying adhesive to pre-determined, programmable areas of a bag bottom section. Preferably, the apparatus includes a rotatable frame supporting the matrix of adhesive extrusion guns whereby the frame is rotatable to production and maintenance positions. The frame may be further rotatable to a bag jam position and means may be provided for automatically causing the frame to move from the production position to the bag jam position on the occurrence of a paper jam in the area of the rotatable frame.

DESCRIPTION OF THE DRAWINGS

The present invention is described in detail below with reference to the following drawings in which like reference numerals refer throughout to like elements.

DETAILED DESCRIPTION OF PREFERRED EMBODIMENT

Figure 1:
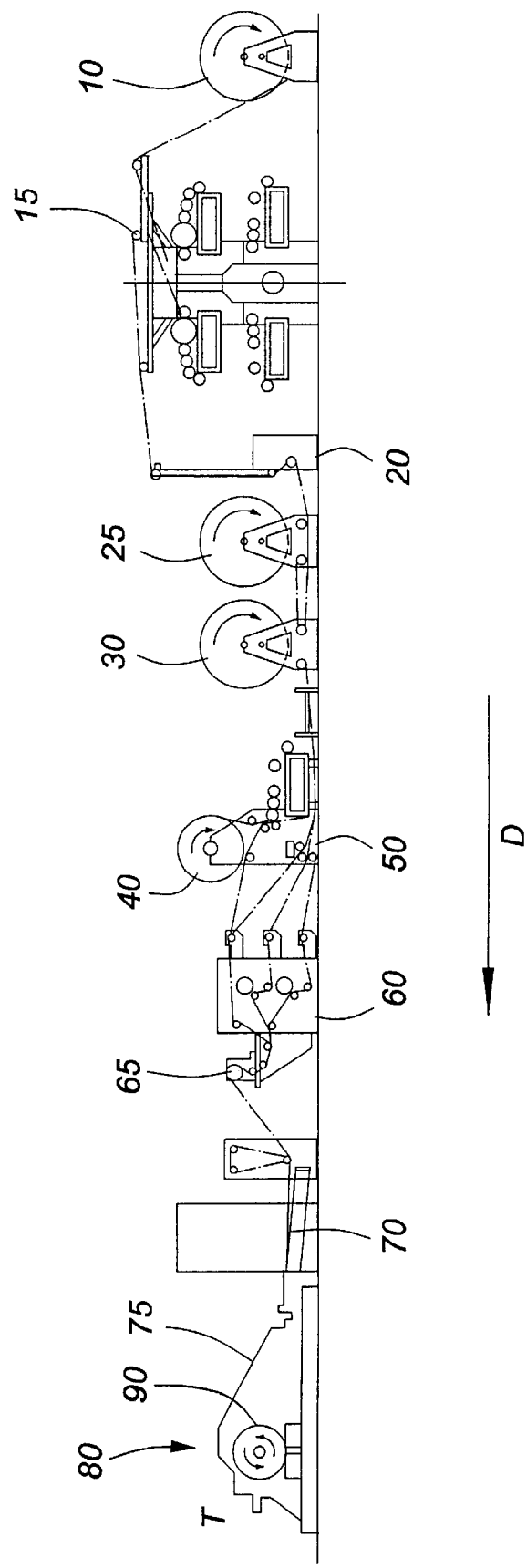
FIG. 1 is a schematic diagram showing the overall components of the apparatus and process steps for making a wet waste compostable bag in accordance with the invention.
Figure 9A:
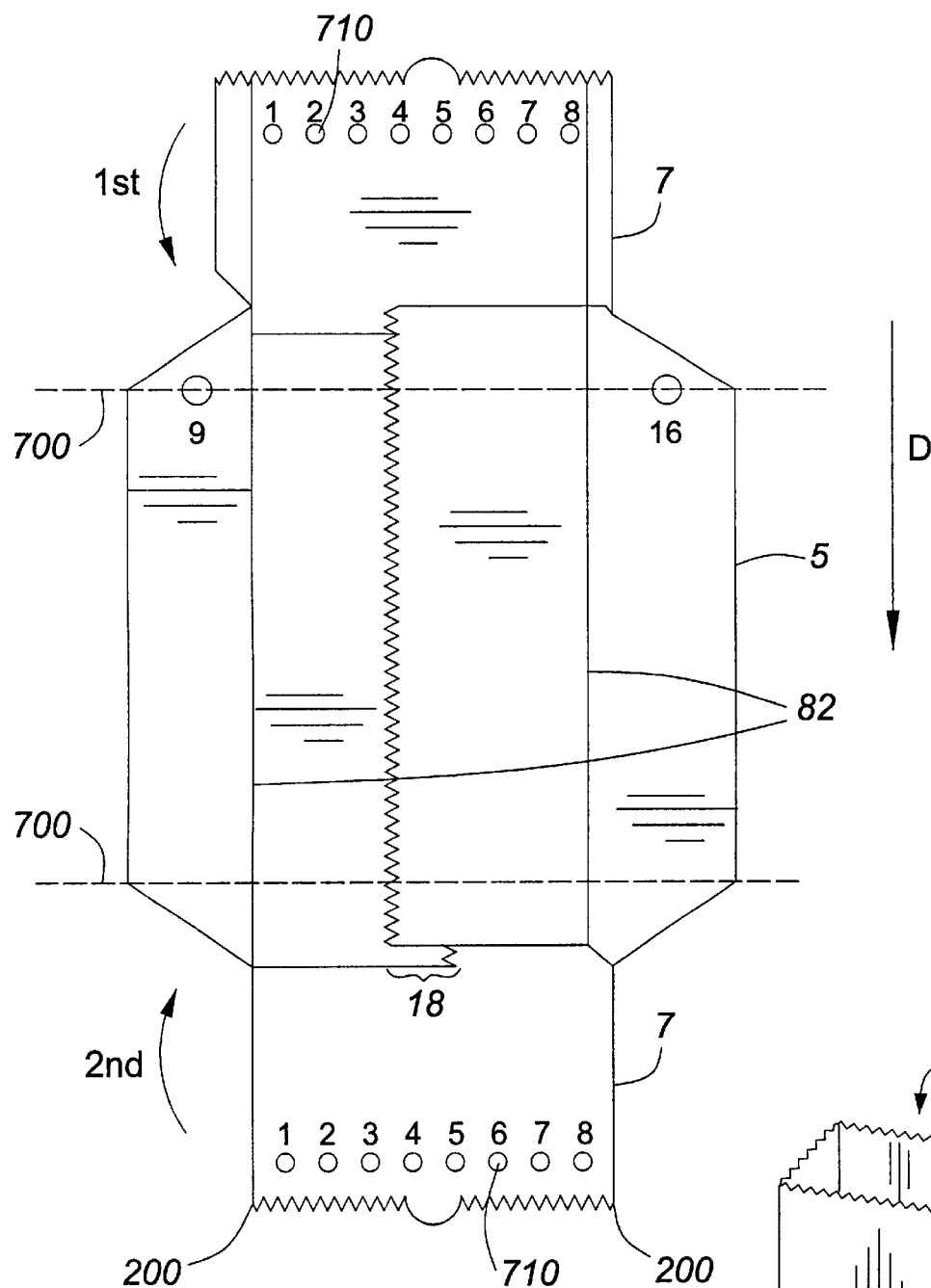
FIG. 9(b) is a perspective view of the manufactured compostable bag in an upright opened position.
Figure 9B:
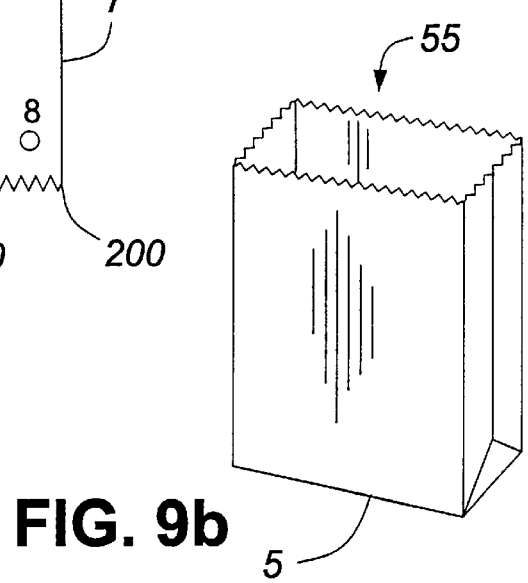

FIG. 1 of the drawings shows an overall process and apparatus for making a wet waste compostable bag 55 (see FIG. 9(b)) in accordance with the invention. The direction of the process (i.e. the production line flow) is shown by the arrow D. A paper rollstand 10, a 4-colour slide press 15 and a web tension unit 20 may (optionally) be provided to print onto the outside of the outer paper layer 115 of the two-ply SOS (self-opening style) bag produced by this embodiment. To provide the outer paper layer of the bag either the rollstand 10 or 25 is used (rollstand 25 being used instead of rollstand 10 if it is not desired to use printer 15 for printing onto the outer layer). A second paper rollstand 30 provides an inner paper layer 110 so that the paper layer of the bag is two-ply and is thereby rendered substantially stronger than would be a single ply paper bag. A cellulose film 105 is continuously run from a cellulose film roll 40 to cover the inside paper layer 110 and the cellulose film 105 is laminated to the paper layer 110 within the laminator 50.

The two paper layers 110, 115 are adhered together by applying simple adhesive tacks in a web-end component 60 and a slitter (not shown) of component 60 slits the end of the web laminate to assist in the forming of the folds on the bottom of the bag. An adhesive extrusion plate 65 at the front end of component 60 precisely applies two thin spaced lines of adhesive to the inner paper layer along one side length of the paper web to provide for the bag seam when the web is turned to form a tube during the following step. At the time the cellulose and paper layers 105, 110 are overlaid (i.e. prior to their lamination) they are positioned in overlapping relationship so that the seam adhesive is applied to the paper only and not to the cellulose film. A web former 70 folds over approximately half the width of the paper/cellulose laminate web 120 to form the tube of the bag and at the same time a roller (not shown) applies pressure to the underside of the seam adhesive area so as to complete the tube formation. A servo drive motor 75 provides the rotation which draws the three-layer tube into the forming area of an H.G. Webber 9 AW SOS bag machine 80. In the bag machine 80 the tube is cut to the required length for the bag using a rotating cutoff knife (not shown) and a series of grippers and folders (not shown) form the bottom sections of the bag such that a double inside bottom fold (i.e. without any gap), as shown by reference 18 in FIG. 9, is produced. Suction cups (not shown) open up the bottom sections of the bag and prepare it to be pulled away from the tube processing area of the bag machine 80 to become attached to the rotating drum 90. The bag bottom is rotated on the drum 90 to a target position T where a bottom extrusion numerical system (referred to herein using the designation "BENS" which has been adopted by the applicant to refer to this apparatus) deposits a pre-determined, pre-programmed cycle of adhesive onto targeted areas of the bottom bag 5.

For the paper layers 110 and 115 a virgin, wet strength Kraft paper provided by Tolko Paper of Le Pas, Manitoba, Canada under the designation SPK (Speciality Produced Kraft) is preferred for use. A recycled kraft paper product could instead be used if it is chosen to do so but such papers typically comprise substantially higher trace elements of metals and these trace elements would be found in the composted bag materials of bags made with such recycled paper. For the cellulose film the applicant uses a specially formulated film product produced by UCB S.A. of Belgium under the product code 320 DM and, unlike prior cellulose films, this film, being fully compostable, does not comprise phalates (which are undesirable for submission into the food chain). This cellulose film is a transparent, one-side nitrocellulose coated film and is impermeable to liquid. Unlike the prior cellulose films which include a plasticizer on each side (plasticizer being necessary to hold together the cellulose material in the form of a film and also to provide the required impermeability to liquids) and for which heat lamination processes are used to melt the plasticizer, the cellulose film 105 used for this preferred embodiment has only one side coated with a plasticizer and the other surface thereby permits successful lamination without the use of heat and using only a cold glue process within the laminator 50. Advantageously, this one-sided cellulose film 105 also has a very high water vapour transfer rate of 6.4 grams per 100 square inch area over a 24 hour period and a good oxygen transfer rate of 0.52 grams per 100 square inch area over a 24 hour period. Good water vapour and oxygen transfer is necessary in order to maintain an aerobic status of the food waste while the bag is sealed. Without such a transfer, through the paper/cellulose film laminate 120, an anaerobic decomposition of the food waste will occur and this would result in the creation of unsatisfactory odours.

The laminator 50 shown in FIG. 3 is an L9 laminator produced by H. G. Webber of Wisconsin, U.S.A. and a clutch release mechanism (not shown) is used on the cellulose film cylinder shaft to in order to apply a drag force to the cellulose so as to reduce the frequency of breakage of the cellulose film which is relatively brittle. The cold glue formulated for use in the laminator 50 and application to the cellulose film 105 is a PVA (polyvinylacetate)-based glue produced by H. B. Fuller under the product code S3879 GB and is fast drying and fully biodegradable. The glue is contained in a trough (container) 125 of the laminator 50 and is picked up and applied to the cellulose film 105 by a plate cylinder 130 covered with a rubber metering cover (sleeve) 135, the metering cover 135 comprising a relatively dense dot projection matrix 140 as shown in FIG. 3. The metering cover 135 causes the glue to be applied to the cellulose film 105 in a dot matrix pattern and thereby avoids a film (full-surface) coverage over the cellulose film layer which would retard the transfer of water vapour and oxygen through the paper/cellulose laminate. This is important because it is an objective that the adhesive cover as much of he surface as possible to avoid the stress points associates with the prior art adhesive patches (at which the cellulose film is prone to tear) but, as explained above, it is also important that the cellulose be permitted to breath (i.e. to permit the passage of water vapour and oxygen through the porous film). Since the spacing of the glue points is close together in such a dot matrix format this first objective is met and, at the same time, the spacing between the glue dots enables the cellulose to breath.

Figure 2:
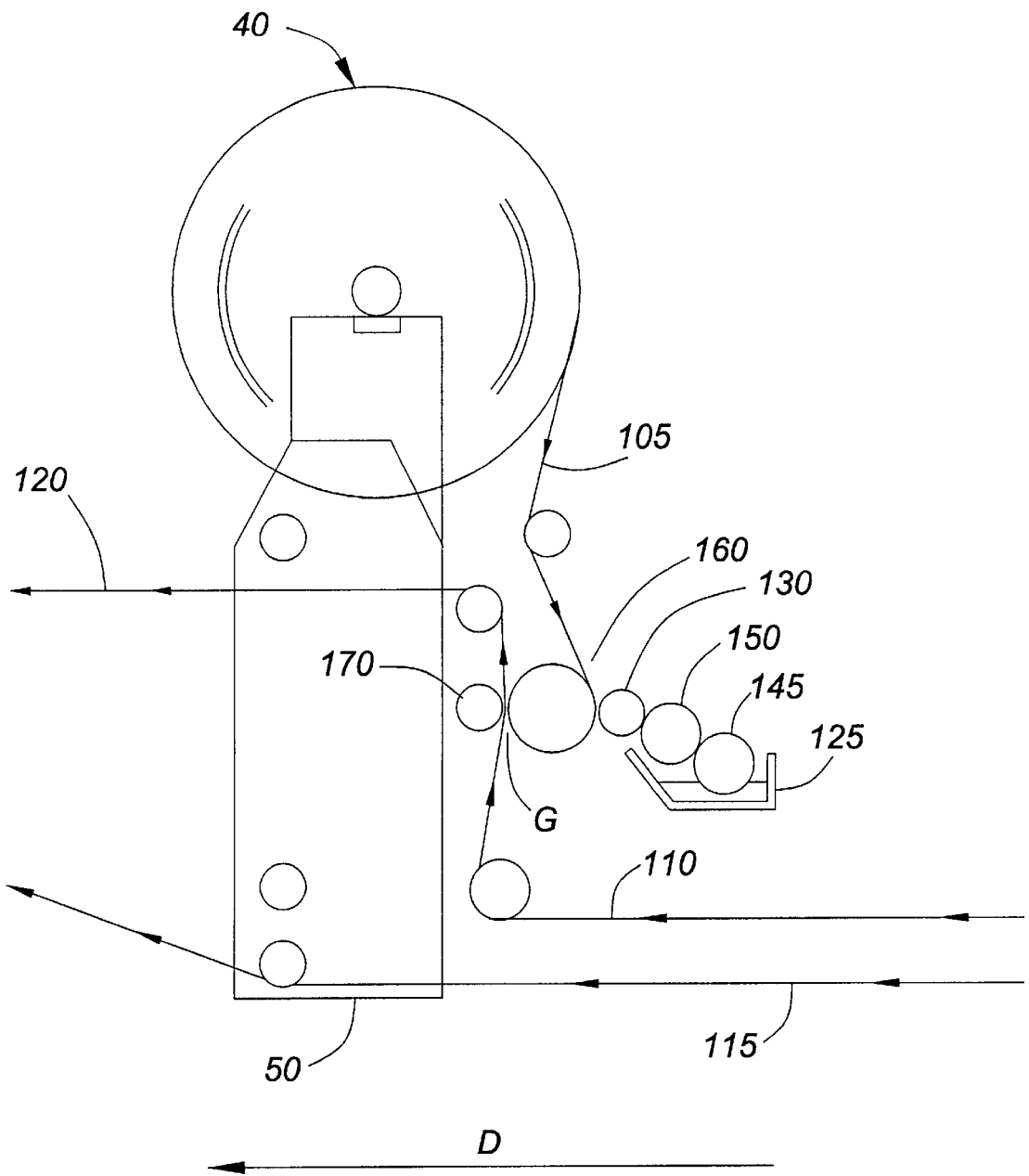
FIG. 2 is a side view of the laminator showing the process of laminating the cellulose film to the inner ply paper layer in accordance with the invention.
Figure 3A:
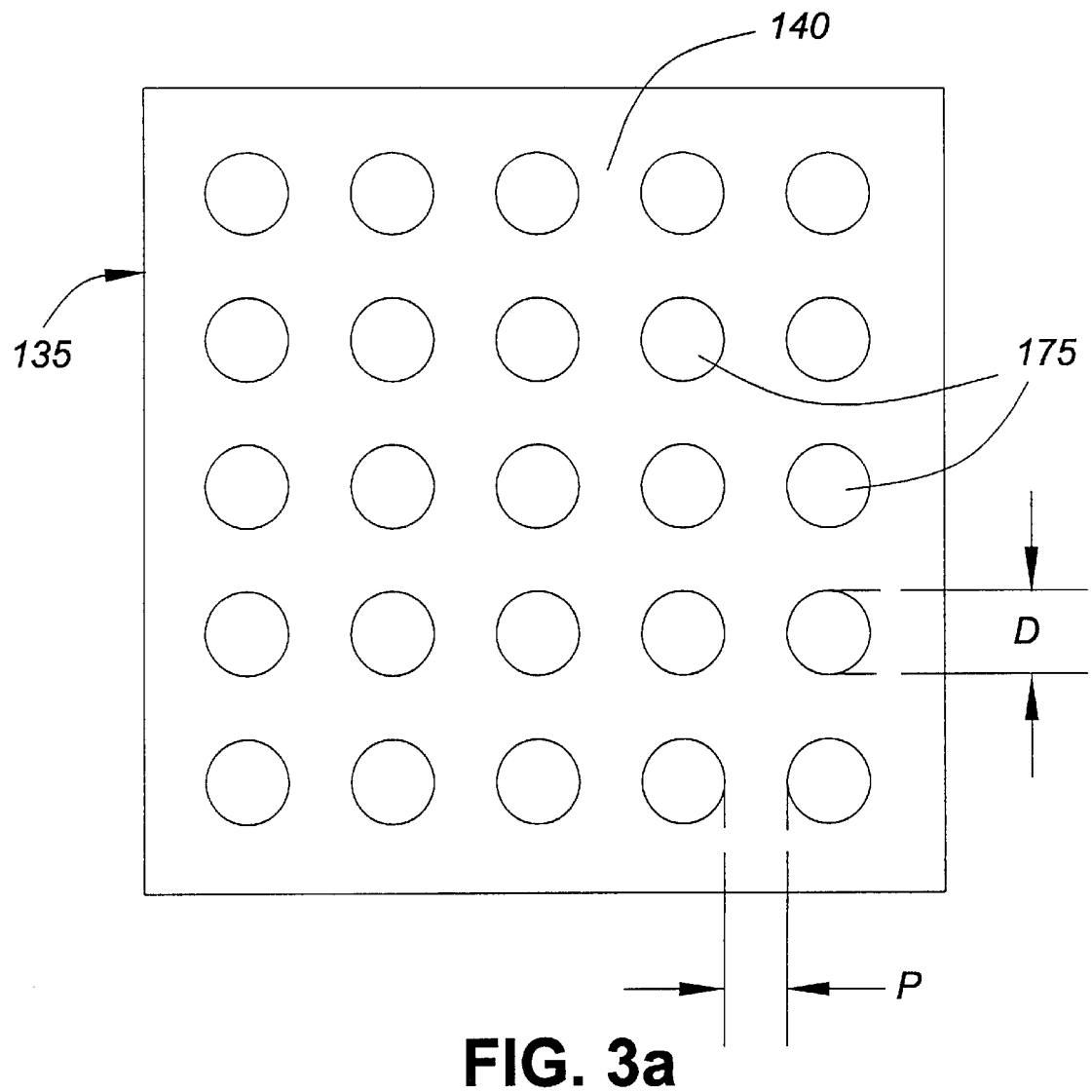
FIGS. 3(a) and (b) illustrates the rubber cover of the plate cylinder of the laminator, with FIG. 3(a) being a plan view of the dot matrix metering cover and FIG. 3(b) being a side view thereof showing the relative spacing and size of the dot projections of the metering cover.
Figure 3B:
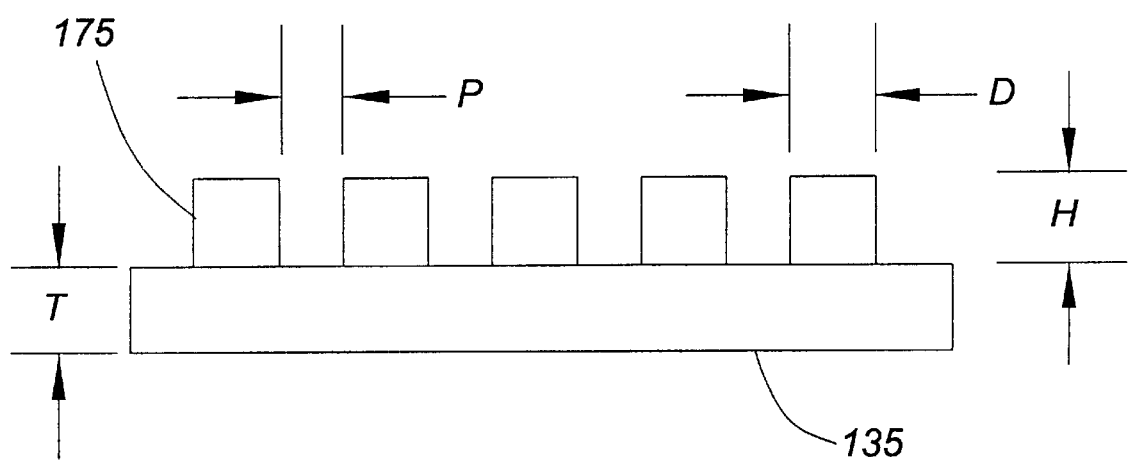

As shown in FIG. 2 a fountain roller 145 is immersed in the glue in container 125 and the glue is thereby transferred first to a chambered anilox roller 150, then to the plate cylinder 130 which is wrapped in the metering dot matrix rubber cover 135 and then to the cellulose film 105 which is rotating around an impression cylinder 160. At point G the paper 110 and cellulose film 105 are laminated together by pressure applied from a rubber-coated compression cylinder 170. A plan view of the dot matrix rubber cover 135 is shown by FIG. 3(a) and FIG. 3(b) shows, in side view, the relative spacing and size of the dot projections 175.

For the preferred metering cover 135 used by the applicant the crown diameter D of the projections is 0.032 inch, the height H of the projections is 0.045 inch, the pitch P of the projections is 0.030 inch and the thickness T of the cover 135 is 0.105 inch. For this particular dot matrix projection spacing and size the resulting bag 55 achieves about 65% of the water vapour transfer rate (WVTR) of the cellulose film 105 itself (which has the high value of 6.4 g/100 sq.in./24 hrs) and this means that the WVTR value of the bag is also very high as compared with prior known wet waste compostable bags. The oxygen transfer rate is about the same for the resulting bag 55 as for the cellulose film 105 itself. The dot projections 175 are equally spaced and have preselected diameters and surface areas at the crown, whereby these parameters may be varied to control (i.e. meter) the amount of glue which is applied to the cellulose film 105 and, in turn, the permeability (WVTR) of the paper/cellulose laminate and the resulting bag 55. The height H of the dot projections 175 can also affect the results of the lamination process because too small a height can result in a build up of glue between the crowns of the projections and an excess of glue being applied to the cellulose film causing a full-surface coverage of the film and poor permeability performance. Therefore, by appropriately pre-determining these parameters of the projections the lamination process and the performance of the resulting bag can be controlled according to the desires of the manufacturer.

Advantageously, the combination of the three layers of the web laminate, being the paper layer, the glue layer and the cellulose layer, produces an increased tensile strength of the resulting bag.

Figure 4:
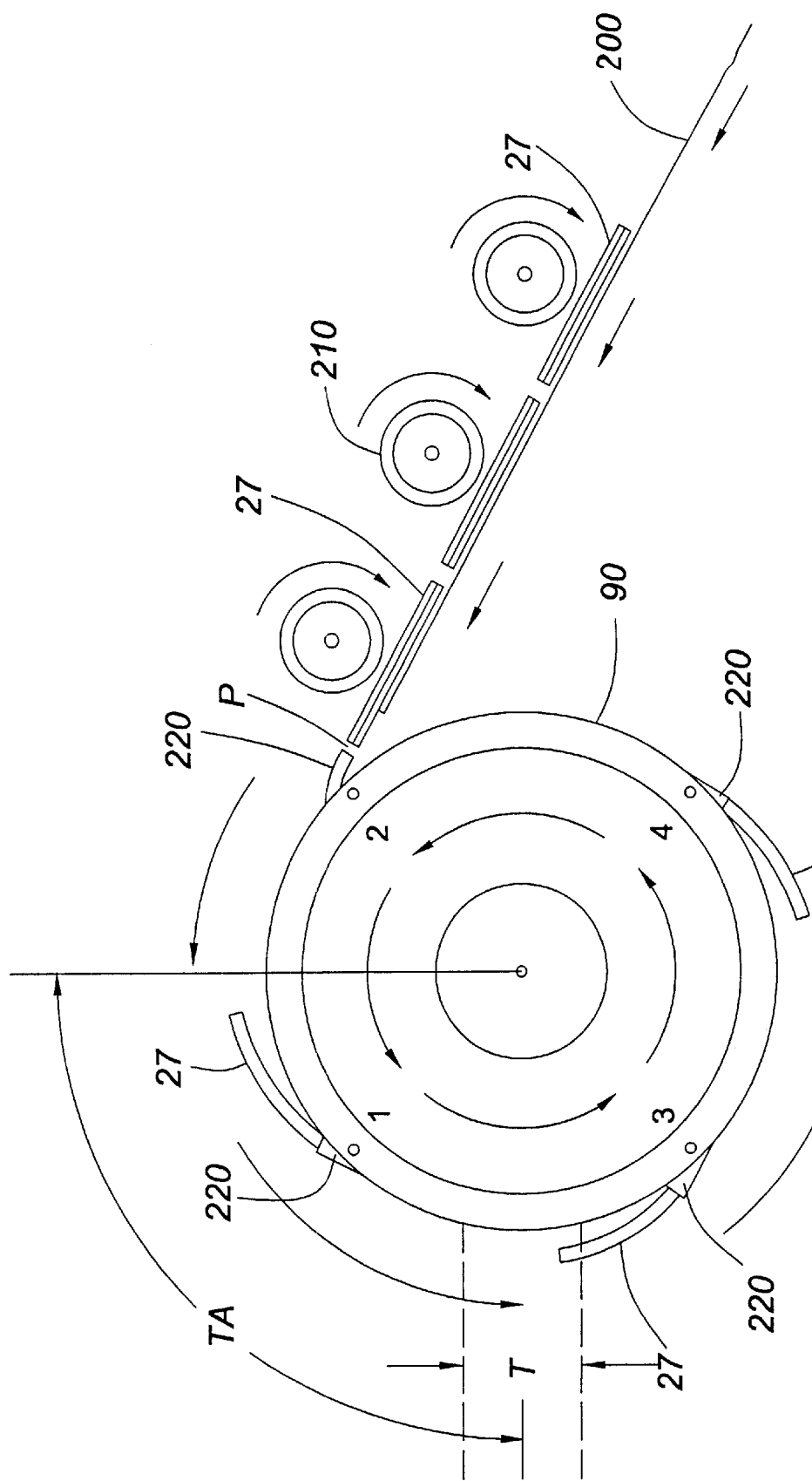
FIG. 4 is a side view of the rotating drum located at the final stage of the process which picks-up, targets and drops-off the bags.

Following the tube processing 70 of the paper/cellulose film laminate web (see FIG. 1) and cutting of the tube into the desired bag lengths, the cut, separated bags 27 are moved up a belt 200, by means of rotating transfer rollers 210, of the bag machine 80 as shown in detail in FIG. 4. At point P (corresponding to point 1 shown on drum 90) a separated bag 27 is picked-up by a cam actuated grippers 220 which pull the bag 27 onto the continuously rotating drum 90. The picked-up bag 27 then travels on the drum 90 to the BENS target position T between points 2 and 3 shown on the drum 90. At the target area T the BENS apparatus 300 (see FIGS. 5 and 6) deposits adhesive (glue) onto the bottom of the bag 5 as described herein. The bag 27 next travels to point 3 shown on the drum where the flaps 7 (see FIG. 9(a)) of the bag are folded in to close the bottom of the bag. Lastly, the bag 27 travels to point 4 shown on the drum where it is released onto a conveyer to a bag unload area (not shown). This cycle is repeated continuously and the bottom bag 5 is exposed on the drum 90 from points 1 through 3 shown thereon.

Figure 5:
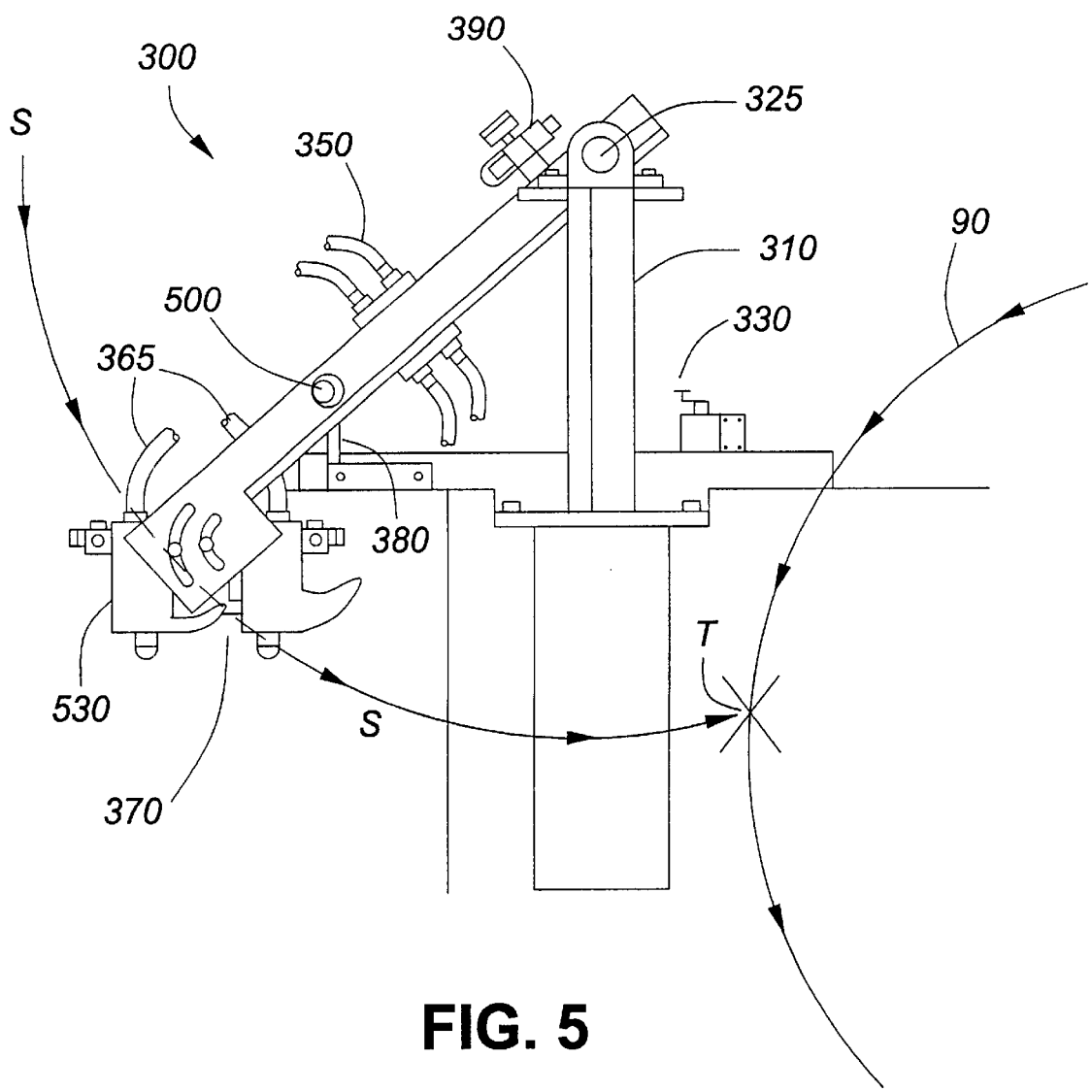
FIG. 5 is a side view of the bottom extrusion numerical system (alternatively referred to herein as "BENS") in accordance with the invention by which adhesive is targeted to pre-determined areas of the bottoms of the bags as they pass over the target area T of the rotating drum shown in FIG. 4, the position of the BENS system being shown here in its (outwardly swung) maintenance position.

The bottom extrusion numerical system (BENS) of the invention, and its positioning relative to the rotating drum 90, is shown in FIGS. 5 (a side view thereof) and 6 (a front view thereof). The BENS apparatus 300 provides the adhesive deposit onto the bottom bag 5 according to a predetermined, pre-programmed configuration using a matrix of 8×2 pneumatically powered extrusion cold glue guns 370. Since the bottom construction of the bag is most critical in the case of a wet waste bag (i.e. since some degree of liquid will build up at the bottom as the bag is used) the BENS gluing application provides an effective and highly flexible means of precisely controlling the location and amounts of all glue deposits applied to the bottom bag 5. In addition, because a cold glue is used the cost of supplying heat energy is not required. The glue used for the bottom bag 5, and also for the tube seam, is relatively viscous and is supplied by H.B. Fuller under the product code 3879RN.

As shown in FIG. 5 the BENS apparatus 300 comprises a frame structure having a fixed (stationary) frame section 310 which is affixed to the machine frame 625 and a movable frame section 320. The movable frame section 320 is able to swing via pillow block 325 along the radius S from a production position adjacent the target area T in which the frame 320 is held by a spring loaded ball detent 340, to a bag jam position which is spaced outwardly from the production position and which occurs automatically through the co-ordinated operation of the ball detent 340 and a bag jam limit switch 330 (see FIGS. 7 and 8) if and when the bag is detected to be jammed in the area of the production position, and also to a manually directed maintenance position via a release lever 380, as shown in FIG. 5, which is amply spaced outwardly from the drum 90 to allow for handling and maintenance work to be done on the various BENS components. Two rows of eight extrusion glue guns 370 (product code number LV227 produced by Nordson Corporation of the U.S.A., these guns having been modified by the applicant to widen the bores so as to increase their adhesive volume capacity and deposition potential) are mounted within parallel slots on an aluminum gun bracket 400 which is affixed to the moveable frame 320, whereby the individual guns 370 are slidable within the slots such that they can be positioned as desired over the length of the bracket 400 to accommodate different bag sizes and bottoms within the range of the bag machine 80. Glue manifolds 350 provide the required 16 glue conveyance lines for the air actuated glue guns 370 and these lines are operated by electric solenoids and powered by a pneumatic system fed an air manifold 605 and air supply 390 mounted on a swing shaft 615. The positioning of the foregoing components relative to the target area T of the drum 90, and the bags 27 thereon, is best seen from FIG. 6. A ski 530 (see FIG. 5) is attached to the moveable frame 320 adjacent the guns 370 and holds the targeted bag 27 a fixed distance away from the guns to reduce the build up of paper dust in the area of the extrusion points of the glue guns and also to protect the gun nozzles from damage during a paper jam. As shown in the illustrated embodiment, a total of four glue manifolds 350 are used and each manifold supplies four glue gun feed lines 365 (i.e. each manifold supplies a set of four of the guns 370).

The gluing system comprising the guns 370, glue lines 365 and manifolds 350 is completely enclosed and until the glue is actually extruded from the guns for deposit onto the bottom bag 5 it is not exposed to air. The firing of the glue guns 370 is controlled by a programmable PC 55 Series control unit (not illustrated herein) which is also produced by Nordson Corporation of the U.S. and was appropriately modified by the applicant for the 16 gun, 4 manifold system of the illustrated embodiment. Information concerning the PC 55 may be found at the Website of Nordson Corporation at the Internet site address www.nordson.com/packaging/pc50.htm which is incorporated herein by reference. In the selected configuration the glue guns are grouped into four separate control zones such that four separately controllable areas are provided. The manifold 350 labelled A in FIG. 6 feeds the guns labelled 1–4 in this figure to provide a first control zone and, likewise, manifolds B, C and D feed the guns groups 5–8, 9–12 and 13–16, respectively, to provide three other control zones. This precise means of controlling the bottom bag glue deposit enables the quality and integrity of the bottom bag construction to be monitored and maintained more easily and inexpensively on the production line and, because only the exact amount of glue needed is deposited, the glue material usage is economized and not wasted.

The BENS apparatus further includes Nordson Corporation glue pumps (two being used with two double action piston pumps) and an air valve system with a servo proportional valve (by which the glue volume deposited is maintained regardless of any change in speed of the drum 90). The operating speed of the bag machine is approximately 110 bags per minute.

Figure 7:
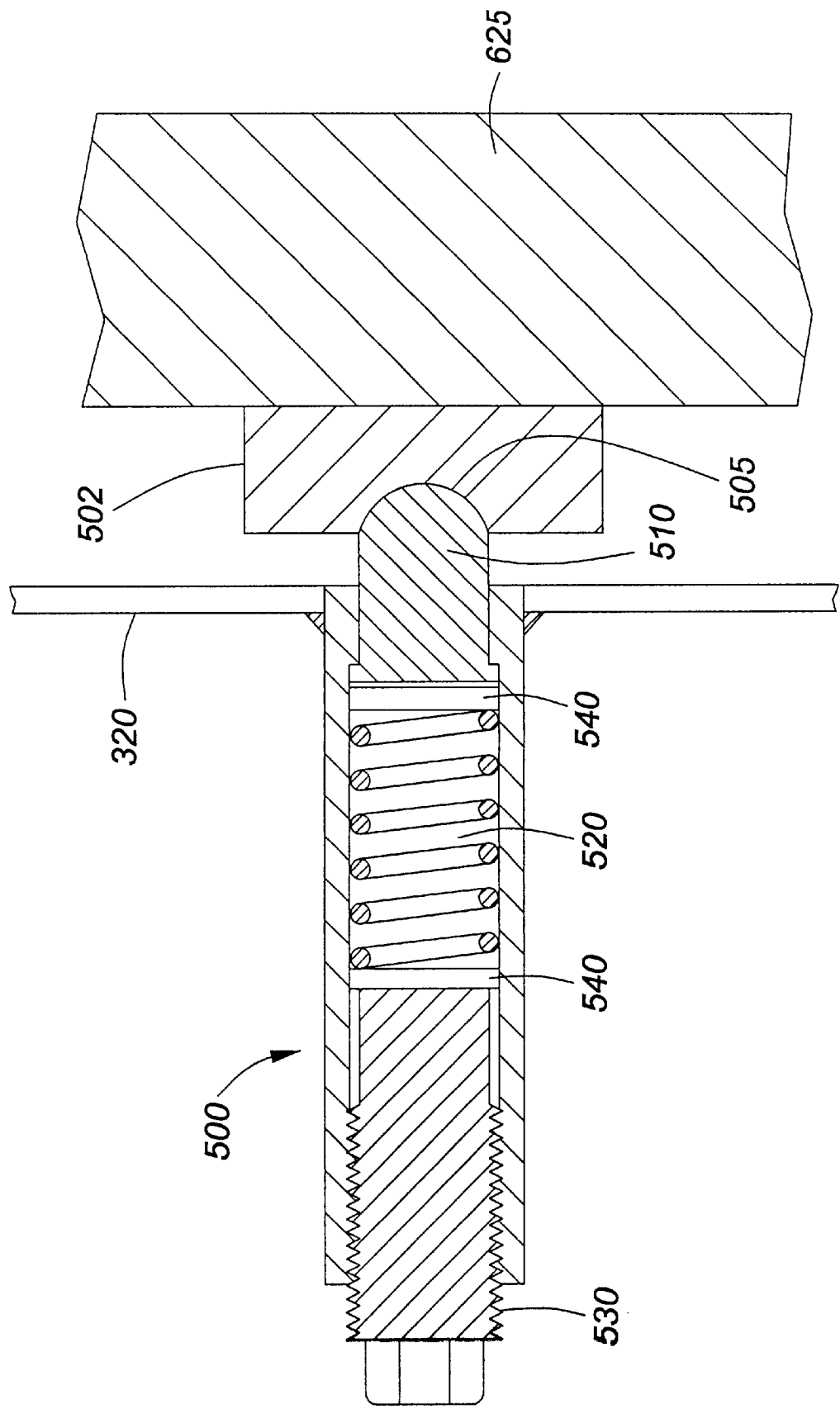
FIG. 7 is a sectional schematic view of the spring loaded ball detent positioner of the BENS system shown in FIGS. 5 and 6.
Figure 8A:
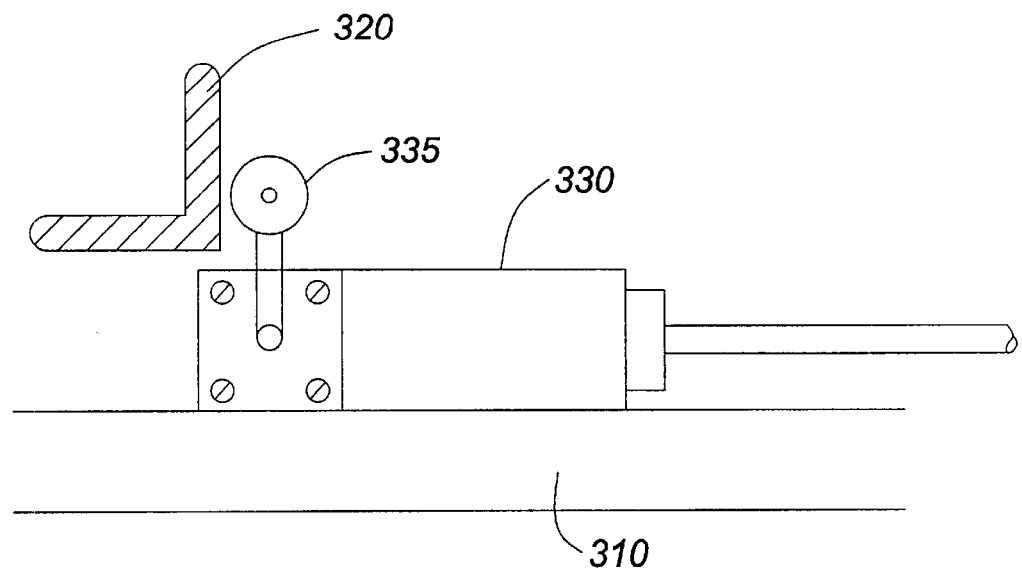
FIGS. 8(a) and 8(b) are side schematic views of the bag jam limit switch of the BENS system shown in FIGS. 5 and 6 with FIG. 8(a) showing the switch in its production position and FIG. 8(b) showing the switch in its bag jam position; and, FIG. 9(a) is a more detailed plan view of the BENS-targeted bottom bag (numbered 1 and 2 in FIG. 6 in the order of the process flow), showing marked thereon an example of a pre-determined adhesive deposit pattern.
Figure 8B:
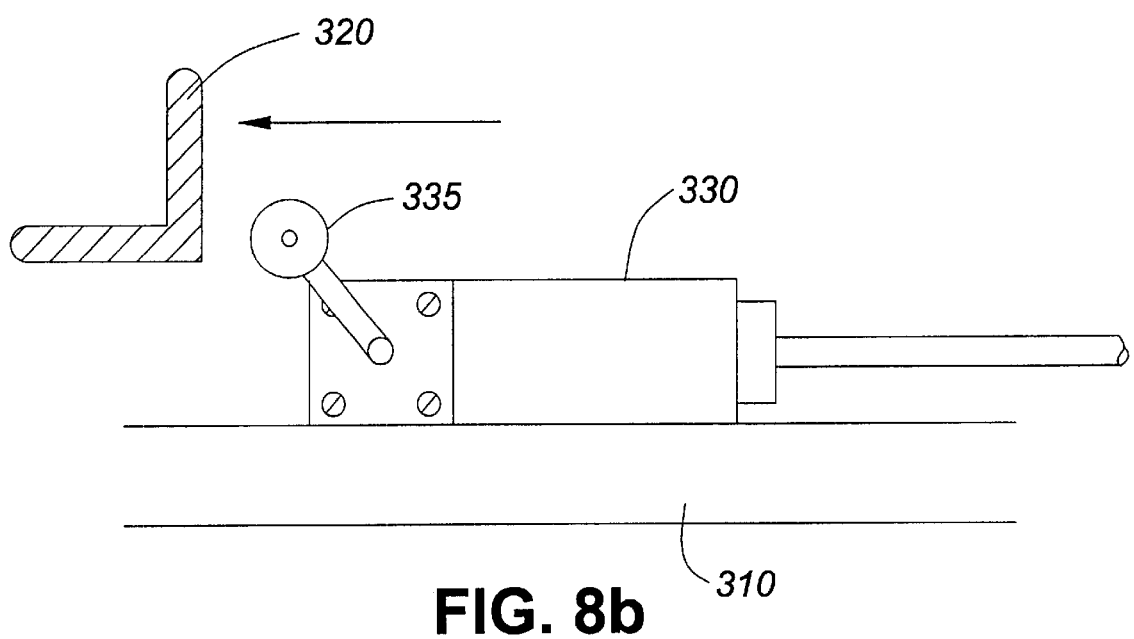

The activation of the glue gun control unit is triggered by the arrival of the bag 27 at the target position T when photo sensors (not shown) sense the flap corners 200 (see FIG. 7) and generate control signals which are fed into the control unit. FIG. 7 shows the glue deposits applied to the bag bottom 5, consisting of spot deposits 710 close to the edge on each flap 7 which are applied by glue guns 1–8 and also guns 9 and 16 (i.e. along the first of the two score lines 700) and linear deposits 82 each of which is applied by a single gun under a continuous fire program control mode for an appropriate time period.

For purposes of programming the glue control unit the servo motor 75 produces 3600 pulses during one rotation of the drum 90 and, thus, each pulse represents a perimeter increment equal to the drum perimeter divided by the total number of pulses (3600). In the preferred embodiment a 9AW size drum 90 is used so each increment is less than a tenth of an inch. The drum 90 provides four stations for the bag, each defining a quadrant of the drum, as shown by the numbers 1–4 on the drum of FIG. 4. The second of these is the target area (designated "TA" in FIG. 4) of the drum. The control units starts counting the increments when it detects (via two photo sensors) the front corners 200 (see FIG. 9) of the bag arriving in the target area TA and the programmed firing of the BENS glue guns is based on a program defined by the increment count over the target area which, in turn, precisely defines an adhesive application pattern. One example of a programmed pattern is shown in FIG. 9 in which discrete (spot) glue deposits are shown by the numbers 1–8, 9 and 16 and the linear glue deposits are shown by the number 82. The glue spots 9 and 16 are positioned at the score line 700 of the bag bottom to seal the bottom at that fold. The bottom flaps 7 of the bottom bag 5 are then folded over as shown by the "$1^{st}$" and "$2^{nd}$" arrows in FIG. 9 and pressure is applied to the bottom of the bag by rollers (not shown) to complete the manufacture of the bag 55.

Figure 6:
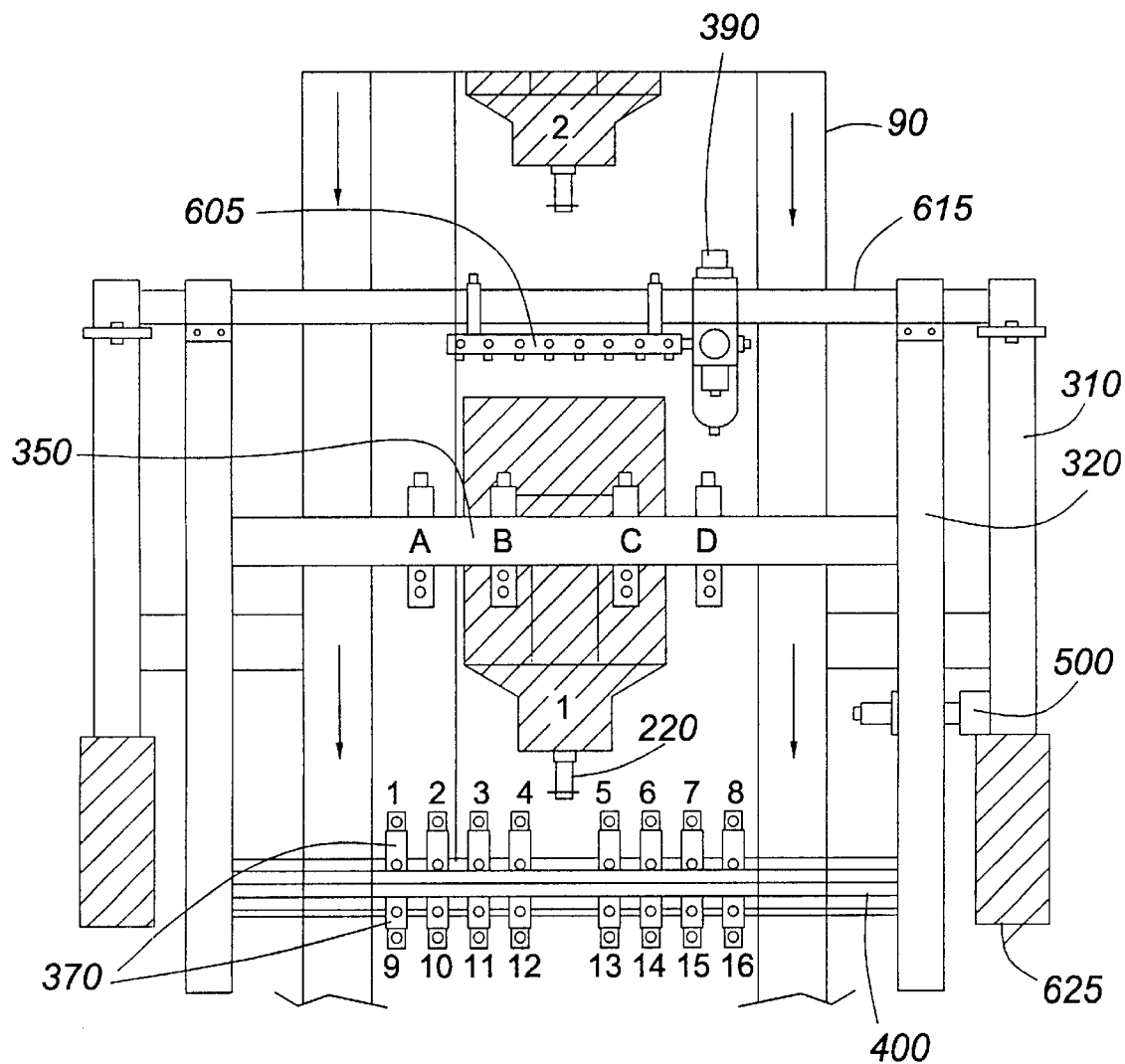
FIG. 6 is the front view of the BENS system of FIG. 5 but with the system swung into its production (i.e. operating) position.

The glue guns etc. of the BENS apparatus are protected from damage by a paper jam by the automatic release mechanism of the ball detent assembly 500 and limit switch 330 which are illustrated in FIGS. 5 and 6, respectively. The detent assembly 500 (shown in cutaway section in FIG. 5) is used to hold the BENS apparatus in the production position adjacent the target point T of drum 90. A nylon block 502 is machined with a recess 505 to receive the ball shape of a brass ball plunger 510 which is biassed in this position by a compression spring 520, the force of the bias being adjustable by threading of the threaded plunger 530. Flat washers 540 are provided at each of the spring 520 as shown. In the event that a bag or other object becomes wedged at the bag target area T, between the drum 90 and the extrusion glue guns 370, the biassing pressure of spring 520 is overridden and the plunger 510 is caused to move out of its biassed position within the recess 505 of the nylon block 502. Upon such release of the ball detent the complete frame 320 swings away from the drum 90 and hangs vertically (held by gravity) in a rest position. The limit switch 330 (being electrically powered) is fixed to the stationary frame 310 and, in production, maintains contact with the movable frame 320 through a biassed striker 335. However, when the ball detent assembly releases and causes the moveable frame 320 to swing away from the drum 90 the limit switch 330 is caused to de-activate by the movement of the striker 335 to a non-contact (switching) position and, in addition, the bag machine 80 is caused to stop by de-energizing the electrical power to the machine. The bag jam limit switch 330 also de-energizes the BENS apparatus controls so that firing of the guns ceases but the control program is maintained in a non-fire mode. In the case of such a jam and release of the detent assembly the subject of the jam is manually corrected and the frame 320 and detent assembly are manually returned to their production positions so that the bag machine 80 may be re-activated and the production process resumed.

It is to be understood that the specific types and configurations of the machine components described herein with reference to the illustrated preferred embodiment are not intended to limit the invention; for example, the invention is not intended to be limited to any specific configuration for the adhesive metering plate of the laminator or extrusion guns of the BENS apparatus, for which various alternative embodiments may be determined by one skilled in the art based upon the teachings herein and the particular application. Further, it is to be recognized that the BENS apparatus disclosed and taught herein is not limited to use on any particular type of bag composition or laminate such as the cellulose-lined type of bag material used for the preferred embodiment disclosed herein (possible alternative materials being a biodegradable polymer-lined type bag material or other liquid impermeable film-lined type bag material). Rather the invention is defined by the appended claims.

What is claimed is:

1. A compostable bag for containing wet waste and comprising cellulose-laminated paper, said cellulose-laminated paper comprising one or more adjacent outer paper layers and an inner cellulose film layer laminated to an innermost one of said paper layers by means of an adhesive applied in a dot matrix configuration wherein dot spacings of said dot matrix are preselected to permit passage of water vapour and oxygen through said cellulose-laminated paper and reduce any creation of stress points on said cellulose film.

2. A compostable bag according to claim 1 wherein said adhesive is a cold glue.

3. A compostable bag according to claim 2 wherein said cellulose film has a sufficiently high water vapour transfer rate to maintain an aerobic status of food waste contained in said bag when said bag is sealed.

4. A compostable bag according to claim 3 wherein the water vapour transfer rate through said bag is at least 65% of the water vapour transfer rate of said cellulose film.

5. A compostable bag according to claim 2 wherein said cellulose film is coated with a plasticizer on one side thereof opposite said innermost paper layer and non-coated on an opposite side thereof adjacent said innermost paper layer, said cold glue having been applied to said opposite side without use of heat.

6. A compostable bag according to claim 1 wherein the bottom of said bag comprises folds and layers of said cellulose-laminated paper wherein said layers are adhered together by means of a second adhesive in a predetermined, programmable pattern which achieves a sealing of said bottom.

7. A compostable bag according to claim 6 wherein said pattern of said second adhesive is pre-programmed and applied by a matrix of extrusion adhesive guns activated according to a program of a pre-programmed controller.

8. A compostable bag according to claim 5 wherein said cellulose film is one-side nitrocellulose coated film.

9. A compostable bag according to claim 2 wherein said cold glue is a polyvinylacetate-based, biodegradable glue.

10. A compostable bag for containing wet waste and comprising cellulose-laminated paper, said cellulose-laminated paper comprising one or more adjacent outer paper layers and an inner cellulose film layer laminated to an innermost one of said paper layers by means of a cold glue applied in a dot matrix configuration wherein said cellulose film is coated with a plasticizer on only one side thereof opposite said innermost paper layer, said cold glue having been applied without use of heat to a side of said cellulose film adjacent said innermost paper layer.

11. A compostable bag according to claim 10 wherein said cellulose film is one-side nitrocellulose coated film.

12. A compostable bag according to claim 11 wherein said cold glue is a polyvinylacetate-based, biodegradable glue.

* * * * *